United States Patent
Doster et al.

(10) Patent No.: US 11,687,442 B2
(45) Date of Patent: Jun. 27, 2023

(54) DYNAMIC RESOURCE PROVISIONING FOR USE CASES

(71) Applicant: International Business Machines Corporation, Armonk, NY (US)

(72) Inventors: Bard Allen Doster, Tucson, AZ (US); Thai T. Pham, Tucson, AZ (US); Brian Michael Seaman, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/396,524

(22) Filed: Aug. 6, 2021

(65) Prior Publication Data
US 2023/0039008 A1 Feb. 9, 2023

(51) Int. Cl.
*G06F 11/36* (2006.01)
*G06F 9/50* (2006.01)

(52) U.S. Cl.
CPC ........ *G06F 11/3688* (2013.01); *G06F 9/5027* (2013.01); *G06F 9/5083* (2013.01); *G06F 11/3692* (2013.01)

(58) Field of Classification Search
CPC ............. G06F 11/3688; G06F 11/3692; G06F 9/5027; G06F 9/5083
USPC ................................................ 717/120–140
See application file for complete search history.

(56) References Cited

U.S. PATENT DOCUMENTS

| 7,281,045 | B2 * | 10/2007 | Aggarwal | H04L 67/1008 709/228 |
| 7,463,648 | B1 * | 12/2008 | Eppstein | G06F 9/5011 709/227 |
| 7,770,058 | B2 * | 8/2010 | Phan | G06F 11/2025 714/6.12 |
| 8,433,803 | B2 | 4/2013 | Madduri et al. | |
| 9,015,324 | B2 * | 4/2015 | Jackson | G06F 9/5027 709/201 |

(Continued)

OTHER PUBLICATIONS

Grechanik et al, "Enhancing Rules For Cloud Resource Provisioning Via Learned Software Performance Models", ACM, pp. 209-214 (Year: 2016).*

(Continued)

*Primary Examiner* — Anil Khatri
(74) *Attorney, Agent, or Firm* — Zilka-Kotab, P.C.

(57) ABSTRACT

A computer-implemented method related to dynamic resource provisioning, includes: receiving, at a computer, a request to facilitate a testing environment, where the request specifies a number and type of resources to be included in the testing environment. A database which lists available resources in systems and/or devices that are in communication with the computer is inspected and the available resources are compared to the number and type of resources specified in the request to be included in the testing environment. In response to determining that a valid combination of the available resources meets the number and type of resources specified in the request to be included in the testing environment, the database is updated to indicate that each of the resources in the valid combination are in use. Moreover, the request is satisfied by returning information about the resources in the valid combination.

20 Claims, 9 Drawing Sheets

(56) References Cited

U.S. PATENT DOCUMENTS

| | | | | |
|---|---|---|---|---|
| 9,021,443 | B1* | 4/2015 | Lachwani | G06F 11/3688 |
| | | | | 717/124 |
| 9,105,000 | B1* | 8/2015 | White | G06F 16/24578 |
| 9,274,903 | B1* | 3/2016 | Garlapati | G06F 11/2002 |
| 9,336,103 | B1* | 5/2016 | Hasbe | G06F 11/27 |
| 9,423,957 | B2 | 8/2016 | Singh et al. | |
| 9,495,214 | B2 | 11/2016 | Tatsubori et al. | |
| 9,781,049 | B2* | 10/2017 | Jensen-Horne | H04L 41/5054 |
| 10,353,790 | B1* | 7/2019 | Rangaiah | G06F 11/1451 |
| 10,452,444 | B1* | 10/2019 | Jibaja | G06F 3/0665 |
| 11,341,032 | B1* | 5/2022 | Abrams | G06F 11/3664 |

OTHER PUBLICATIONS

Troung et al, "Modeling and Provisioning IoT Cloud Systems for Testing Uncertainties", ACM, pp. 1-10 (Year: 2017).*

McGregor et al, "Facilitating Testing and Debugging of Markov Decision Processes with Interactive Visualization", IEEE, pp. 1-9 (Year: 2015).*

Hura et al, "A Method Facilitating Integration Testing of Embedded Software", ACM, pp. 7-11 (Year: 2011).*

Wu et al, "Optimizing Bitmap Indices with Efficient Compression", ACM, pp. 1-38 (Year: 2006).*

Chambi et al, "Optimizing Druid with Roaring bitmaps", ACM, pp. 1-10 (Year: 2016).*

Nikravesh et al., "Towards an Autonomic Auto-Scaling Prediction System for Cloud Resource Provisioning," Presentation, Carlton University, May 2015, 22 pages.

Yao et al., "Multi-Dimensional Scheduling in Cloud Storage Systems," IEEE International Conference on Communications (ICC), 2015, 6 pages, retrieved from https://www.semanticscholar.org/paper/Multi-dimensional-scheduling-in-cloud-storage-Yao-Papapanagiotou/3d06b8a9c421ba446558aa384eb334191ad80050.

Srivastava et al., "Load Management Model for Cloud Computing Using Cloudsim" International Journal of Computer Theory and Engineering, vol. 9, No. 5, Oct. 2017, pp. 390-393.

Garg et al., "SLA-Based Resource Provisioning for Heterogeneous Workloads in a Virtualized Cloud Datacenter," International conference on Algorithms and architectures for parallel processing, 2011, pp. 371-384.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Nikravesh et al., "Towards an Autonomic Auto-Scaling Prediction System for Cloud Resource Provisioning," IEEE 10th International Symposium on Software Engineering for Adaptive and Self-Managing Systems, 2015, pp. 35-45.

* cited by examiner

DYNAMIC RESOURCE PROVISIONING FOR USE CASES

BACKGROUND

The present invention relates to dynamic resource provisioning, and more specifically, this invention relates to satisfying requests to facilitate use environments having specific resources.

In system environments that involve providing specific physical storage components to be used for performing applications, testing, development, etc., changes to the storage infrastructure can have a significant impact on performance of these use cases. As a result, the configurations of the applications, testing, development, etc. must be updated each time the storage infrastructure experiences a change. This introduces a significant amount of inefficiency to the system environments, thereby reducing the efficacy of the use cases being performed. Additionally, if any changes are made to the use cases themselves, e.g., such as introducing new functionality, different storage capabilities, increased size of environment, etc., additional resources (e.g., physical components) which are able to meet these changed settings must be identified. Moreover, subsequent updates may need to be made to the configurations of these use cases to account for the additional resources that have been identified and implemented.

It follows that the ability of these conventional systems to automate processes is negatively impacted when the storage environments themselves change over time. Moreover, these inefficiencies are only exacerbated as the frequency and amplitude of these changes increase.

SUMMARY

A computer-implemented method, according to one embodiment, includes: receiving, at a computer, a request to facilitate a testing environment, where the request specifies a number and type of resources to be included in the testing environment. A database which lists available resources in systems and/or devices that are in communication with the computer is inspected and the available resources are compared to the number and type of resources specified in the request to be included in the testing environment. In response to determining that a valid combination of the available resources meets the number and type of resources specified in the request to be included in the testing environment, the database is updated to indicate that each of the resources in the valid combination are in use. Moreover, the request is satisfied by returning information about the resources in the valid combination.

A computer program product, according to another embodiment, includes a computer readable storage medium having program instructions embodied therewith. Moreover, the program instructions are readable and/or executable by a processor to cause the processor to: perform the foregoing method.

A system, according to yet another embodiment, includes: a processor, and logic integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
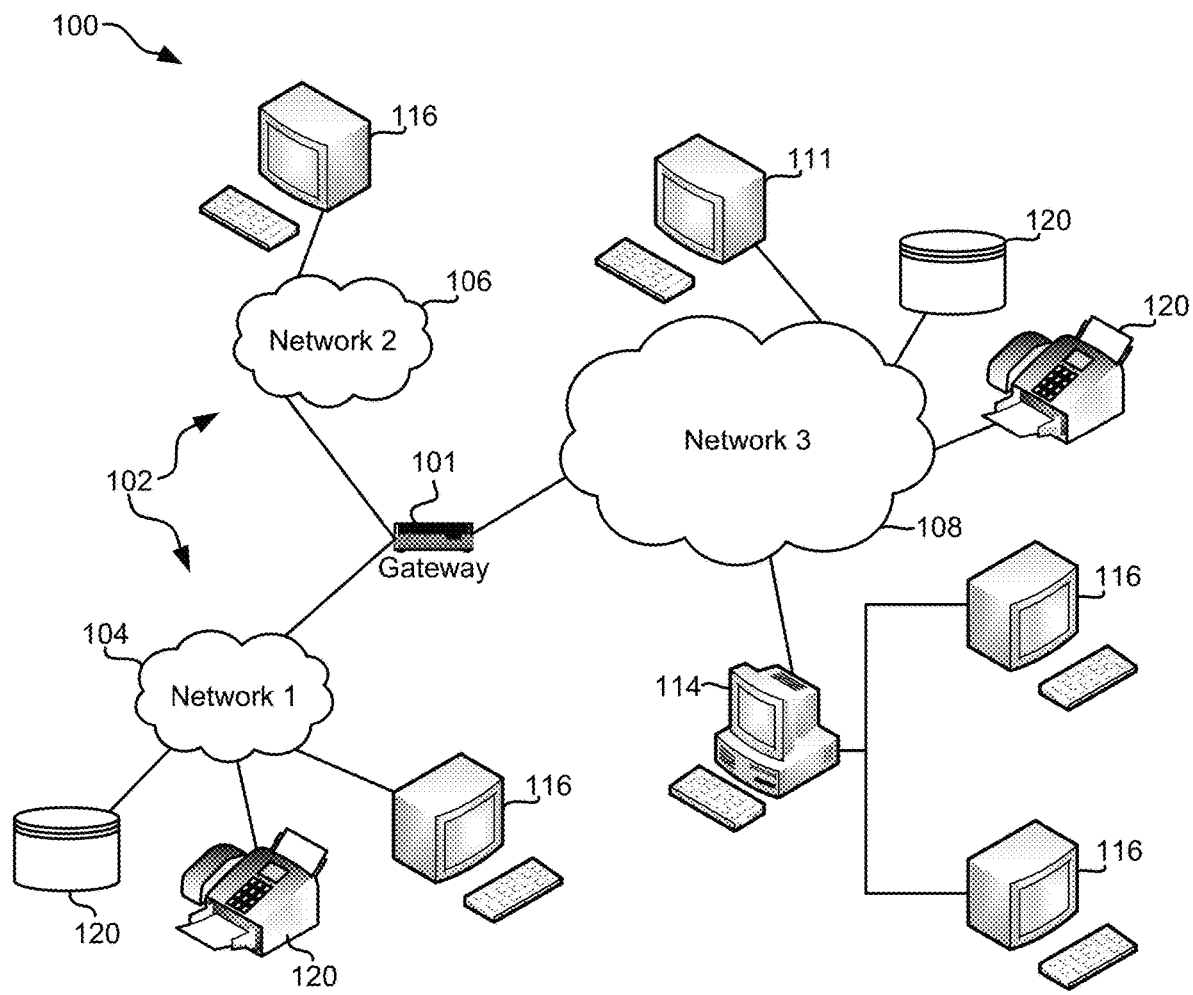
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for satisfying use requests as they are received by implementing an updated representation of various physical components and their respective availability. Various ones of the approaches included herein are able to transform the traditionally static relationship between application settings and available storage resources into a fluid relationship, where changing requests in the application and changing availability of resources are handled independently and automatically. This allows for the overarching system and those systems that are connected thereto to function more efficiently and reduce the consumption of computing resources during the process of satisfying a request to facilitate a testing environment, e.g., as will be described in further detail below.

In one general embodiment, a computer-implemented method includes: receiving, at a computer, a request to facilitate a testing environment, where the request specifies a number and type of resources to be included in the testing environment. A database which lists available resources in systems and/or devices that are in communication with the computer is inspected and the available resources are compared to the number and type of resources specified in the request to be included in the testing environment. In response to determining that a valid combination of the available resources meets the number and type of resources specified in the request to be included in the testing environment, the database is updated to indicate that each of the resources in the valid combination are in use. Moreover, the request is satisfied by returning information about the resources in the valid combination.

In another general embodiment, a computer program product includes a computer readable storage medium having program instructions embodied therewith. Moreover, the program instructions are readable and/or executable by a processor to cause the processor to: perform the foregoing method.

In yet another general embodiment, a system includes: a processor, and logic integrated with the processor, executable by the processor, or integrated with and executable by the processor. Moreover, the logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
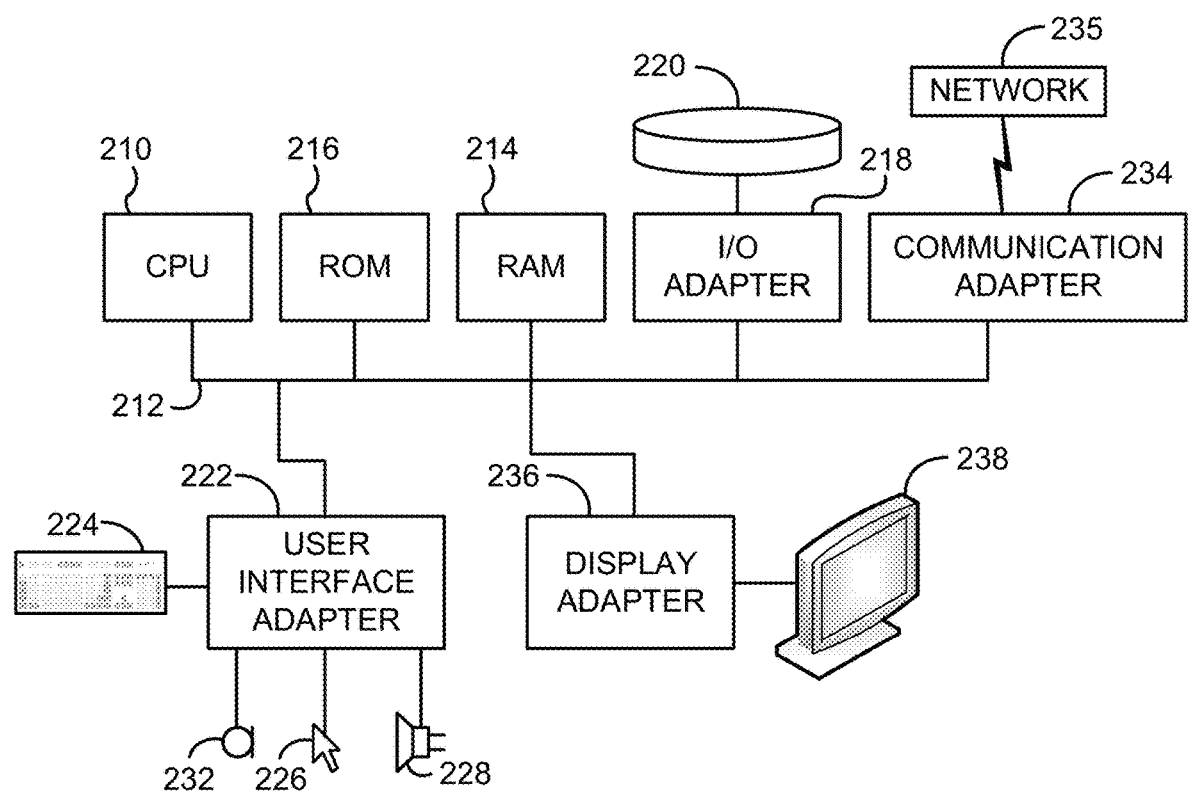
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
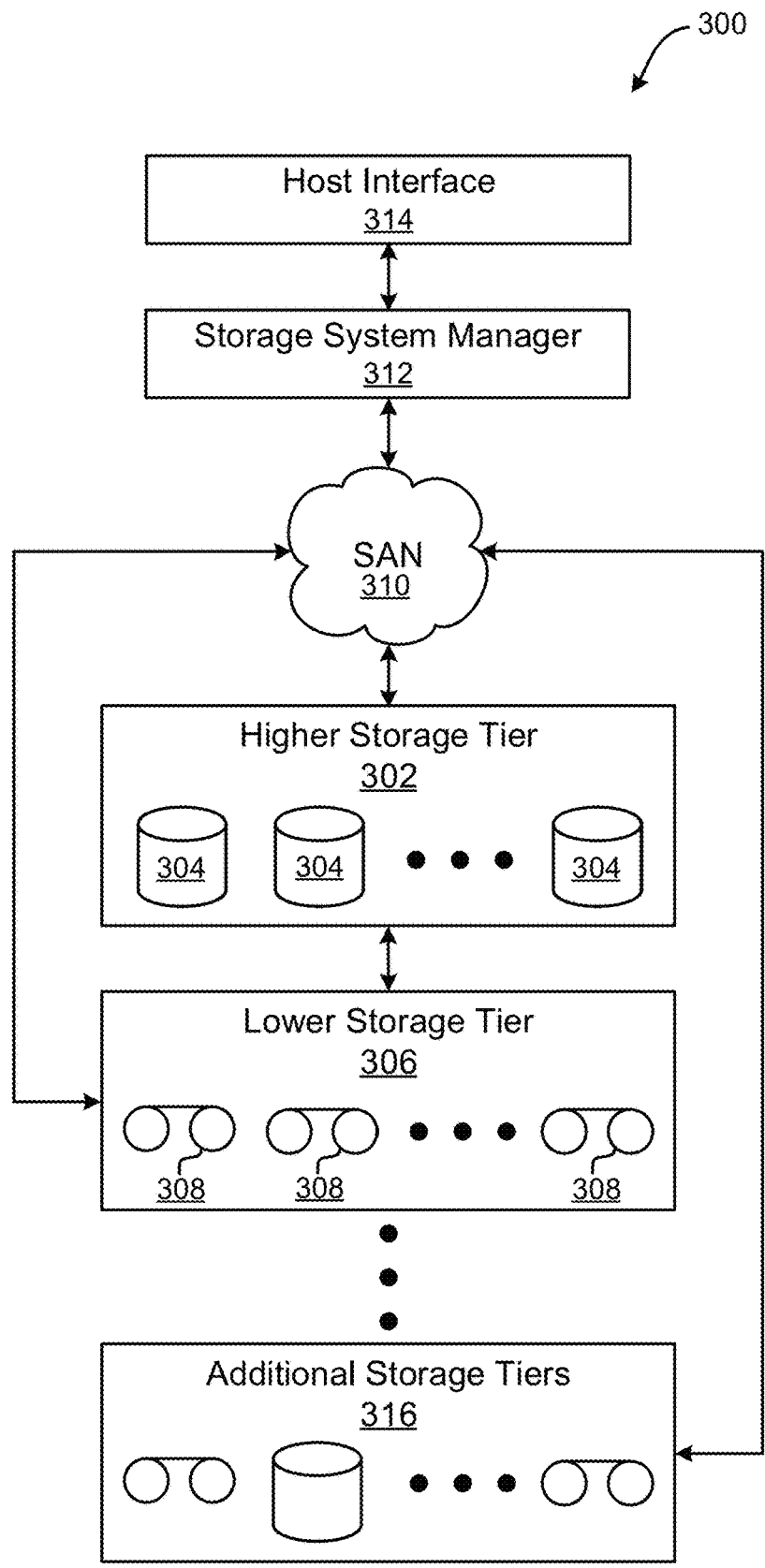
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), Flash memory, SSD arrays, Flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, for systems that involve providing specific physical storage components to be used for performing applications, testing, development, etc., changes to the storage infrastructure can have a significant impact on performance of these use cases. As a result, the configurations of the applications, testing, development, etc. must be updated each time the storage infrastructure experiences a change. This introduces a significant amount of inefficiency to the system environments, thereby reducing the efficacy of the use cases being performed. Additionally, if any changes are made to the use cases themselves, e.g., such as introducing new functionality, different storage capabilities, increased size of environment, etc., additional resources (e.g., physical components) which are able to meet these changed settings must be identified. Moreover, subsequent updates may need to be made to the configurations of these use cases to account for the additional resources that have been identified and implemented.

It follows that the ability of these conventional systems to automate processes is negatively impacted when the storage environments themselves change over time. While elastic storage environments can provide flexibility to storage capacity settings, they are unable to address any specific storage requirements other than capacity and therefore have been unable to remedy these issues. Moreover, these inefficiencies are only exacerbated as the frequency and amplitude of these changes to the storage environments and/or use cases increase.

In sharp contrast to the foregoing conventional shortcomings, various ones of the approaches included herein are able to efficiently and accurately facilitate various use cases. For instance, some of the approaches herein involve using dynamic resource provisioning such that when the use case is initiated, all available resources are parsed through and the specific devices which meet the specific use case are returned along with full information about the devices, which can then be used by the use case accordingly. Dynamic discovery as described in the approaches herein thereby allows for systems to be fluid beneath the use case, allowing ease of automation as well as adaptation to changes in the system and/or use case itself, e.g., as will be described in further detail below.

Figure 4:
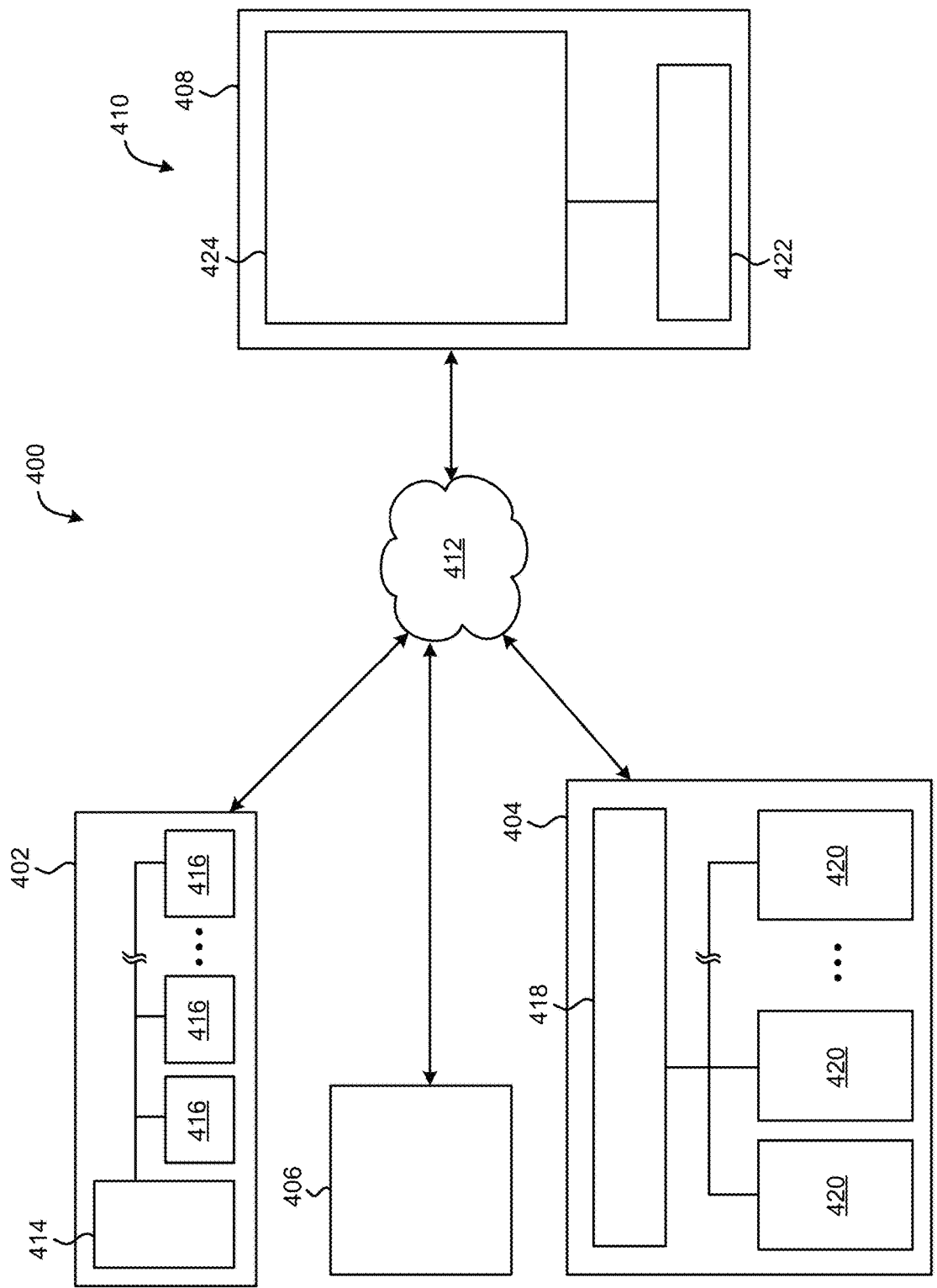
FIG. 4 is a partial representational view of a dynamic resource provisioning system, in accordance with one embodiment.

Looking now to FIG. 4, a dynamic resource provisioning system 400 is depicted in accordance with one embodiment. As an option, the present system 400 may be implemented in conjunction with features from any other embodiment listed herein, such as those described with reference to the other FIGS. However, such system 400 and others presented herein may be used in various applications and/or in permutations which may or may not be specifically described in the illustrative embodiments listed herein. Further, the system 400 presented herein may be used in any desired environment. Thus FIG. 4 (and the other FIGS.) may be deemed to include any possible permutation.

As shown, a number of systems 402, 404 and devices 406 are connected to a test environment 408 at a cloud computing environment 410 over a network 412. Depending on the approach, the various systems 402, 404 and devices 406 may be positioned at a same location, coupled to each other, spread across different remote locations, etc. It follows that the test environment 408 may be able to at least communicate with (e.g., send information, instructions, requests, etc. between) any desired number of systems and/or devices that are connected to the network 412. However, in some approaches the test environment 408 may actually be physically coupled to one or more systems and/or devices which may thereby be able to communicate with the test environment 408 off the network 412.

The network 412 itself may be of any type, e.g., depending on the desired approach. For instance, in some approaches the network 412 is a WAN, e.g., such as the Internet. However, an illustrative list of other network types which network 412 may implement includes, but is not limited to, a LAN, a PSTN, a SAN, an internal telephone network, etc. Accordingly, the test environment 408 at a cloud computing environment 410 is able to communicate with the systems 402, 404 and devices 406 regardless of the amount of separation which exists therebetween, e.g., despite being positioned at different geographical locations.

Looking to the systems 402, 404 that are connected to the network 412, a number of devices (e.g., physical components) are included therein. For instance, system 402 includes a cache 414 which is coupled to a number of processors 416, while system 404 includes a storage controller 418 coupled to a plurality of data storage devices 420 (e.g., SSDs). It follows that the various systems that may be in communication with the test environment 408 can have any number and/or configuration of devices included therein. Moreover, the device 406 itself may be any desired type of physical component. According to an example which is in no way intended to limit the invention, the device 406 may simply be a computing component capable of executing commands of a type known in the art, such as a central processing unit (CPU), a field programmable gate array (FPGA), an application specific integrated circuit (ASIC), etc.

Looking now to the test environment 408 at the cloud computing environment 410, a device manager 422 is coupled to a logical framework 424. As noted above, the test environment 408 may be able to at least communicate with (e.g., send information, instructions, requests, etc. between) any desired number of systems and/or devices that are connected thereto. This communication allows for the device manager 422 to actually query the various systems and/or devices to develop an accurate understanding of the physical components that are included therein. The device manager 422 may also preferably keep track of which physical components are currently in use (e.g., unavailable) and which are currently available for use. In some approaches, the device manager 422 maintains a database (e.g., bitmap) which is able to indicate whether each of the physical components are available or currently in use.

The device manager 422 is also preferably able to provision various ones of the devices and physical components to the logical framework 424. In other words, the device manager 422 is preferably able to create a logical representation of desired ones of the devices and physical components that are in communication with the test environment 408. As noted above, it is typically not practical to construct a physical testing environment which actually includes the physical devices in the specific configuration associated with the application, testing, development, etc. As applications, testing, developments, etc. change over time, this physical testing environment and the configuration of physical devices therein change as well, thereby introducing a significant amount of latency in the system.

The logical representation of the devices and physical components may thereby be used to develop a logical representation of a desired physical configuration, e.g., as would be appreciated by one skilled in the art after reading the present description. For example, the device manager 422 may create connections between the logical framework 424 and various physical components (e.g., or at least a controller coupled to the physical component). These connections may be used to deliver data, instructions, requests, etc. to the physical components at their respective locations, e.g., such that an application, test, development, etc. may be run in the logical framework 424 of the test environment 408 while actually utilizing the capabilities of the physical components themselves. As a result, the test environment 408 is able to effectively create any desired configuration of the various devices that are accessible (e.g., not currently being used and in communication with the test environment 408), e.g., as will be described in further detail below.

Figure 5A:
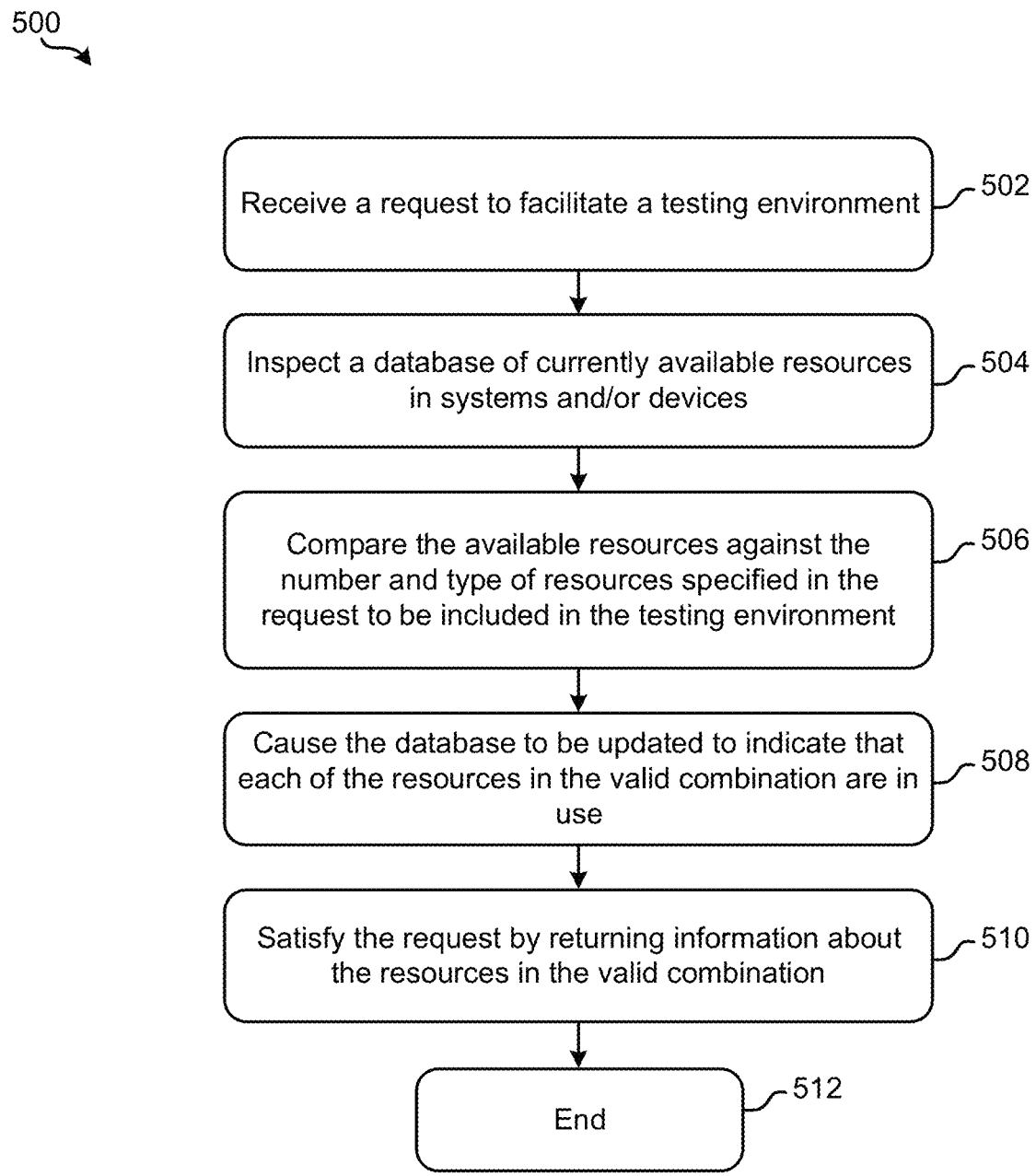
FIG. 5A is a flowchart of a method, in accordance with one embodiment.

Referring now to FIG. 5A, a flowchart of a computer-implemented method 500 is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment using known techniques and/or techniques that would become readily apparent to one skilled in the art upon reading the present disclosure. For example, in some embodiments one or more of the processes included in method 500 may be performed by a controller that is located at a cloud computing environment (e.g., see device manager 422). In various other embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes receiving a request to facilitate a testing environment. As noted above, specific physical devices may be involved with performing certain applications, testing, development, etc. For example, a disaster recovery procedure may involve performing various operations on a specific set of physical components, e.g., which may represent an actual environment where the disaster event occurred. The request thereby preferably specifies a number and/or type of resources to be included in the testing environment. The request may provide additional information to help facilitate the desired testing environment. For instance, the request may also identify how the various resources should be configured and interact with each other, thereby providing an accurate understanding of the desired testing environment. In still other approaches, the request may specify desired capacity levels, functional capabilities, data separation settings, etc., of the resources to be included in the testing environment.

However, in some situations the request may include less information than desired. For instance, the request may specify desired specifications for a specific portion of the testing environment, while a remainder of the testing environment may not be specified. According to an example, a request may indicate specialized devices to be included in the testing environment while a remainder of the environment may be automatically formed using default (e.g., standard) devices. In other situations, the request may not specify any desired configurations for the testing environment. In such situations where the request does not specify all the components that are to be included in the desired testing environment, default components may be utilized. For instance, certain components may be associated with (e.g., assigned to) certain types of operations. Thus, as long as the request specifies what type(s) of operation(s) will be performed, the default components associated with the type(s) of operation(s) may be utilized. In other approaches, a response may be returned to the entity that issued the initial request, where the response requests additional information describing the desired testing environment. It should also be noted that the request may be received from various different sources depending on the particular approach. For instance, in different approaches the request may be received from a running application, a user, another system, etc.

In response to receiving the request, operation 504 includes inspecting a database of currently available resources in systems and/or devices that are at least in communication with (e.g., at least communicatively coupled to) the processor performing method 500. As noted above, a processor (e.g., see device manager 422) may keep track of which physical components are currently in use (e.g., unavailable) and which are currently available for use in a database (e.g., bitmap). The database thereby provides an efficient way to identify whether each of the physical components are available or currently in use without having to actually query each system and/or device after receiving the request, thereby conserving processing overhead and increasing the efficiency of the system as a whole.

In some approaches the database may at least include a bitmap which may be used to indicate whether each of the queried devices are currently in use or not. It follows that the process of marking each of the resources as being in use or as being available for use may include updating a flag in the database which corresponds to each of the respective resources.

However, it should be noted that in some approaches the various systems and/or devices may actually be queried in real time. According to an example, in situations where the database does not include enough available devices to satisfy the request, systems and/or devices may be dynamically queried to determine whether any changes have been made since the database was last updated. For instance, devices which were in use during a previous update to the database may no longer be in use and therefore may actually be available for use despite being indicated as not being available in the database. In other approaches, the various systems and/or devices may actually be queried in real time in response to the database being inaccessible, a user requesting the database be updated with the most recent availability information, etc.

It follows that the database is preferably updated over time. Depending on the approach, the database may be updated periodically, randomly, in response to receiving an update request, in response to a certain condition being met (e.g., the number of available devices in the database falls outside a predetermined range), etc. Accordingly, although not depicted in FIG. 5A, method 500 may include updating the entries in the database at any desired time. For instance, the database may be updated in the background while other operations, applications, tests, etc. are being performed.

Figure 5B:
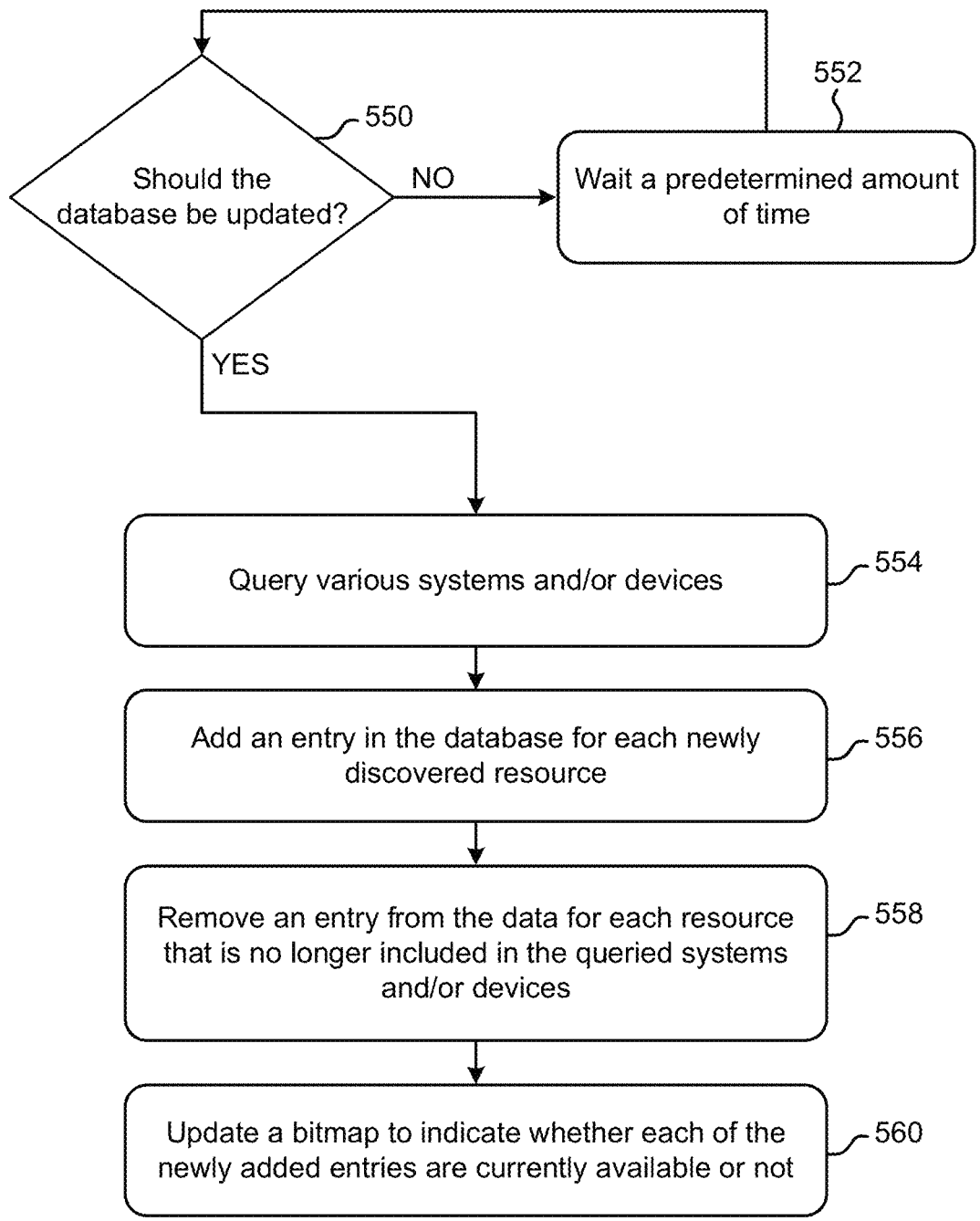
FIG. 5B is a flowchart of sub-processes for one of the optional operations in the method of FIG. 5A, in accordance with one embodiment.

Referring momentarily to FIG. 5B, exemplary sub-processes of updating the database of currently available resources are illustrated in accordance with one embodiment. One or more of these sub-processes may thereby be used to update the database at any desired time. However, it should be noted that the sub-processes of FIG. 5B are illustrated in accordance with one embodiment which is in no way intended to limit the invention.

As shown, decision 550 includes determining whether the database should be updated. Depending on the approach, decision 550 may be performed based on a predetermined timing schedule, using an operation log of the system, by inspecting a number of available devices in the database, etc. In response to determining that the database should not be updated, the flowchart proceeds to sub-operation 552 which includes waiting a predetermined amount of time before returning to decision 550, whereby the determination of whether the database should be updated may be repeated.

In response to determining that the database should be updated, the flowchart proceeds to sub-operation 554 which includes querying various systems and/or devices. As noted above, all systems and/or devices that are in communication with (e.g., at least communicatively coupled to) the processor performing the sub-operation may be queried for a full representation of available components. However, in other approaches only a subset of the systems and/or devices that are communicatively coupled to the processor may be queried, e.g., to reduce processing overhead. For example, only those devices indicated as being currently in use in the database may be queried.

The results of the query may thereby be used to update the entries in the database. Accordingly, sub-operation 556 includes adding an entry in the database for each newly discovered resource while sub-operation 558 includes removing an entry from the database for each resource that is no longer included in the queried systems and/or devices. An indication is also preferably made for each of those entries that are added to the database as to whether the corresponding device is currently in use or not. Thus, sub-operation 560 includes updating a bitmap to indicate whether each of the newly added entries are currently available or not. It follows that the bitmap may be updated using the results of the query which provide the most updated look into how each of the resources that are accessible to (e.g., at least in communication with) the processor that caused the query to be performed. However, it should be noted that different instruments may be used to indicate whether the entries in the database correspond to an available device or an unavailable device. For instance, one or more flags, metadata headers, lookup tables, etc., may be used rather than a bitmap as described above.

Referring back to FIG. 5A, method 500 proceeds from operation 504 to operation 506. There, operation 506 includes comparing the available resources against the number and type of resources specified in the request to be included in the testing environment. Operation 506 thereby involves determining whether any combinations of the resources that are currently available can be used to satisfy the initially received request to facilitate a specific testing environment. While it may be desired in some approaches that the various devices and/or systems are queried dynamically in order to perform the determination in operation 506, in some situations it may not be practical to perform a query operation each time a request is received. Thus, while dynamically querying the devices and/or systems may be performed in response to receiving a request to facilitate a testing environment in some situations, in other approaches a database and bitmap (e.g., as described above in FIG. 5B) may be used to make the determination in operation 506.

While it is preferred that each of the number and type of resources specified in the request are able to be provided, in some approaches a subset of the resources may be offered. For example, the initially received request may specify certain resources as high priority while other resources are denoted as being lower priority. The lower priority resources may thereby be replaced with similar types of resources in situations where the lower priority resources specified in the request are not currently available. Thus, in some situations a comparable testing environment to the one requested may be offered rather than simply failing the request outright. It follows that depending on a result of the determination performed in operation 506, a testing environment that matches the specified number and type of resources may be offered, a testing environment that matches at least some of the specified number and type of resources may be offered, the request may be rejected outright, etc.

In situations where it is determined that a valid combination of the available resources meets the number and type of resources specified in the request to be included in the testing environment, method 500 proceeds to operation 508 which includes causing the database to be updated to indicate that each of the resources in the valid combination are in use. With respect to the present description, it should be noted that a "valid combination" may include any arrangement of available resources that meets the number and type of resources specified in the request. According to an example which is in no way intended to limit the invention, a request may specify that 20 total devices are to be included in the testing environment, and that each of the devices are capable of performing Flash copy operations. A "valid combination" corresponding to the present example may thereby identify 20 devices which are capable of performing Flash copy operations and which are also currently available. Moreover, a valid combination may be represented in any desired format, style, arrangement, etc. that may be desired.

In situations where a testing environment that matches the specified number and type of resources is offered, or even where a testing environment that matches at least some of the specified number and type of resources is offered, it is preferred that those resources used to facilitate the offered testing environment are marked as potentially in use. Moreover, in response to the offered testing environment being accepted by the requesting entity, it is preferred that the resources are actually marked as being currently in use. This prevents these resources from being used for (e.g., assigned to) another environment or to satisfy another request, thereby avoiding any resource corruption, system collisions, reduced operating efficiency, etc. It follows that in some approaches the resources may actually be marked as being currently in use by updating a bitmap in a database, e.g., as described above.

From operation 508, method 500 proceeds to operation 510. There, operation 510 includes satisfying the request, in whole or in part, by returning information about the resources in the valid combination of (available) resources. As noted above, in situations where a testing environment that matches the specified number and type of resources is offered, the initially received request is effectively satisfied as desired. In other situations, less than all of the number and/or type of resources specified in the original request may be available and thereby information about said resources offered in response to the received request. If one such testing environment having less than all of the requested number and/or type of resources is accepted, operation 510 may thereby involve at least partially satisfying the request by returning information about the resources that are available. In still other approaches, the requesting entity may be provided with an option to choose the resources (e.g., devices) that are available in situations where the request cannot be satisfied as received. In such approaches the request may actually be satisfied by returning information about the resources that the requesting entity selects as being acceptable replacements for the resources that were specified in the request originally.

Figure 5C:
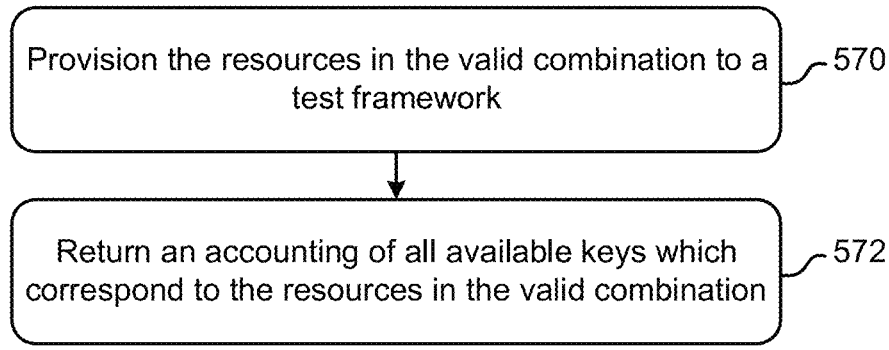
FIG. 5C is a flowchart of sub-processes for one of the operations in the method of FIG. 5A, in accordance with one embodiment.

With respect to the present description, information about the resources in the valid combination of resources may be "returned" in various different forms, depending on the particular approach. For instance, information about the resources in the valid combination of resources may be returned in some approaches by simply supplying information used to communicate with the respective resources, e.g., such as network addresses, resource type, programming language of the respective resources, handshake information, etc. In another approach, the returned valid combination may be a list of available resources in the valid combination, perhaps with more information about one or more of said resources in the valid combination. Referring now to FIG. 5C, exemplary sub-processes of satisfying the request by returning the valid combination of resources are illustrated in accordance with one embodiment, one or more of which may be used to perform operation 510 of FIG. 5A. It follows that the sub-processes illustrated in FIG. 5A may be used to actually return information about the resources in a valid combination of available resources, e.g., as would be appreciated by one skilled in the art after reading the present description. It should also be noted that the sub-processes of FIG. 5C are illustrated in accordance with one embodiment which is in no way intended to limit the invention.

As shown, sub-operation 570 includes provisioning the resources in the valid combination of resources to a test framework. In other words, sub-operation 570 includes establishing a logical infrastructure which includes access channels that provide a way to communicate with the various resources that are to be included in the test framework. The various resources (e.g., physical devices) may thereby be logically represented in the test framework that is formed while remaining in their respective physical locations, wherever they may be. In other words, the test framework may effectively be a logical representation of the various components that are selected to be incorporated therein. The process of provisioning the resources may also involve performing some form of configuration thereto, e.g., as would be appreciated by one skilled in the art after reading the present description. It should also be noted that depending on the particular approach, the term "provisioning" may involve various different types of provisioning, e.g., such as server provisioning, network provisioning, user provisioning, service provisioning, etc.

Moreover, sub-operation 572 includes returning an accounting of all available keys which correspond to the resources in the valid combination. The keys corresponding to the resources may include any type of information that may be used to help facilitate a communication channel therebetween. In other words, the accounting of all available keys may be used to actually create the logical representation of the resources in the testing framework without the resources physically being there. It follows that the available keys may include communication protocol information, handshake information, network connection data, physical locations of the corresponding resources, entries in the database for the various resources, etc. It follows that any desired type of information that may be used to implement, maintain, improve, etc., the actual transfer of information (e.g., data, requests, commands, etc.) between the test framework and the actual resources represented therein may be used.

Returning now to FIG. 5A, from operation 510, the flowchart proceeds to operation 512, whereby method 500 may end. However, it should be noted that although method 500 may end upon reaching operation 512, any one or more of the processes included in method 500 may be repeated in order to process additional test environment requests. In other words, any one or more of the processes included in method 500 may be repeated for subsequently received requests to facilitate testing environments.

Figure 5D:
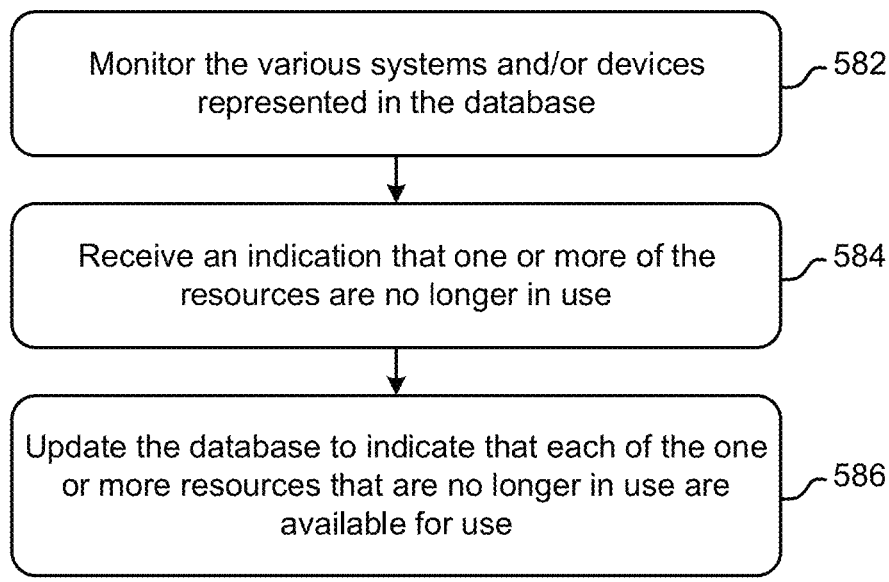
FIG. 5D is a flowchart of a method, in accordance with one embodiment.

While method 500 may end in response to reaching operation 512 as described above, it should be noted that the database is preferably updated over time regardless of whether any testing environments are currently being facilitated. Again, the database preferably maintains an accurate representation of whether each of the available resources are currently being used or not. Thus, FIG. 5D depicts a flowchart of a computer-implemented method 580 is shown according to one embodiment. The method 580 may be performed in accordance with the present invention in any of the environments depicted in FIGS. 1-5C, among others, in various embodiments. Of course, more or less operations than those specifically described in FIG. 5D may be included in method 580, as would be understood by one of skill in the art upon reading the present descriptions.

Each of the steps of the method 580 may be performed by any suitable component of the operating environment using known techniques and/or techniques that would become readily apparent to one skilled in the art upon reading the present disclosure. For example, in various embodiments, the method 580 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 580. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5D, operation 582 of method 580 includes monitoring the various systems and/or devices represented in the database. In other words, operation 582 includes monitoring the various physical components that are in communication with the processor being used to perform the foregoing method (e.g., see device manager 422 of FIG. 4). The various components may be monitored in some approaches by monitoring the network traffic received at a cloud computing environment where the testing environment is facilitated (e.g., see 410 of FIG. 4 above).

Operation 584 further includes receiving an indication that one or more of the resources are no longer in use. In some approaches, the indication may represent that a valid combination of resources previously used to satisfy a request to facilitate a testing environment is no longer in use. Accordingly, the indication may be received from the entity that originally sent the request for the testing environment in some approaches, while in other approaches the indication may be received from a device manager, a running application, etc. Resources may be released from use in response to receiving an indication that the testing environment is no longer desired in some approaches. In other approaches, the resources may be released from use in response to a predetermined amount of time passing since the testing environment was formed, in response to a predetermined condition being satisfied, in response to receiving a notification from the requesting entity, after a predetermined amount of idle time, etc.

Proceeding now to operation 586, the database is updated to indicate that each of the resources in the valid combination are available for use. Again, the database preferably maintains an accurate representation of the status of the various resources that are available. It follows that in response to receiving an indication that one or more of the resources noted in the database as being in use are no longer in use, the database is preferably updated to reflect this new information. As previously mentioned, the database may implement a bitmap which in turn indicates whether each of the resources are currently in use or not. Accordingly, operation 586 may include actually updating the bitmap to reflect that the respective resources are no longer in use and may thereby be used to satisfy subsequently received requests.

It follows that various ones of the approaches included herein are desirably able to satisfy requests as they are received using an updated representation of the various physical components and their respective availability. This allows for the system to successfully satisfy these requests using the most updated use information. In some approaches, the use information is maintained in a database which may even be updated dynamically in response to receiving such a request, thereby ensuring that entries in the database reflect the most recent use information.

According to an in-use example, which is in no way intended to limit the invention, a request to facilitate a testing environment is received. As noted above, such a request may specify a number and/or type of resources to be included in the testing environment. Accordingly, the request specifies that 20 total devices are to be included in the testing environment, and that each of the devices are capable of performing Flash copy operations. The request may also specify that the 20 devices are divided into four different groups, each with five devices, where the first and second groups are copies of each other while the third and fourth groups are copies of each other. The request may further request that certain ones of the devices are positioned in specific locations and/or have different physical relationships with the remaining devices. Accordingly, the request may specify that the first and third groups are on different physical storage subsystems (e.g., are located at two different sites).

The request may also provide additional information to help facilitate the desired testing environment. For instance, the request may also identify how the various resources should be configured and interact with each other, thereby providing an accurate understanding of the desired testing environment. In still other approaches, the request may specify desired capacity levels, functional capabilities, data separation settings, etc., of the resources to be included in the testing environment.

The received request is preferably passed into a dynamic resource provisioning system which is thereby able to investigate the available resources within systems of use through queries. The queries preferably exclude those devices that are currently in use, whether on the same system as the requesting program or on other attached systems. Accordingly, by considering devices that are not in use on other systems, the dynamic provisioning system can provide resources to multiple users across multiple systems.

Once available resources are acquired, a comparison is conducted between the available resources and the specifications from the request, e.g., as determined by the inputs to the system. Once a valid configuration meeting the input specifications is determined, this configuration is marked as in use and returned to the requesting entity, preferably with a complete accounting of available keys for the specific devices and any related storage. Thus, applications, tests or development configurations can then be utilized until returned to the dynamic provisioning system for reuse by the next application requesting same or similar devices.

Because the inventory of available devices across systems may be dynamically discovered at the time of the request, changes of the system storage configuration are accommodated automatically on future requests of the same type without updating the request characteristics. When the application characteristics change, key or configuration inputs can be updated and the next time the dynamic provisioning system processes an application configuration, it will adapt the devices used by the application to the updated settings.

In summary, various ones of the approaches included herein are able to transform the traditionally static relationship between application settings and available storage resources into a fluid relationship, where changing requests in the application and changing availability of resources are handled independently and automatically by the dynamic resource provisioning system. This allows for the overarching system and those systems that are connected thereto to function more efficiently and reduce the consumption of computing resources during the process of satisfying a request to facilitate a testing environment, e.g., as described above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
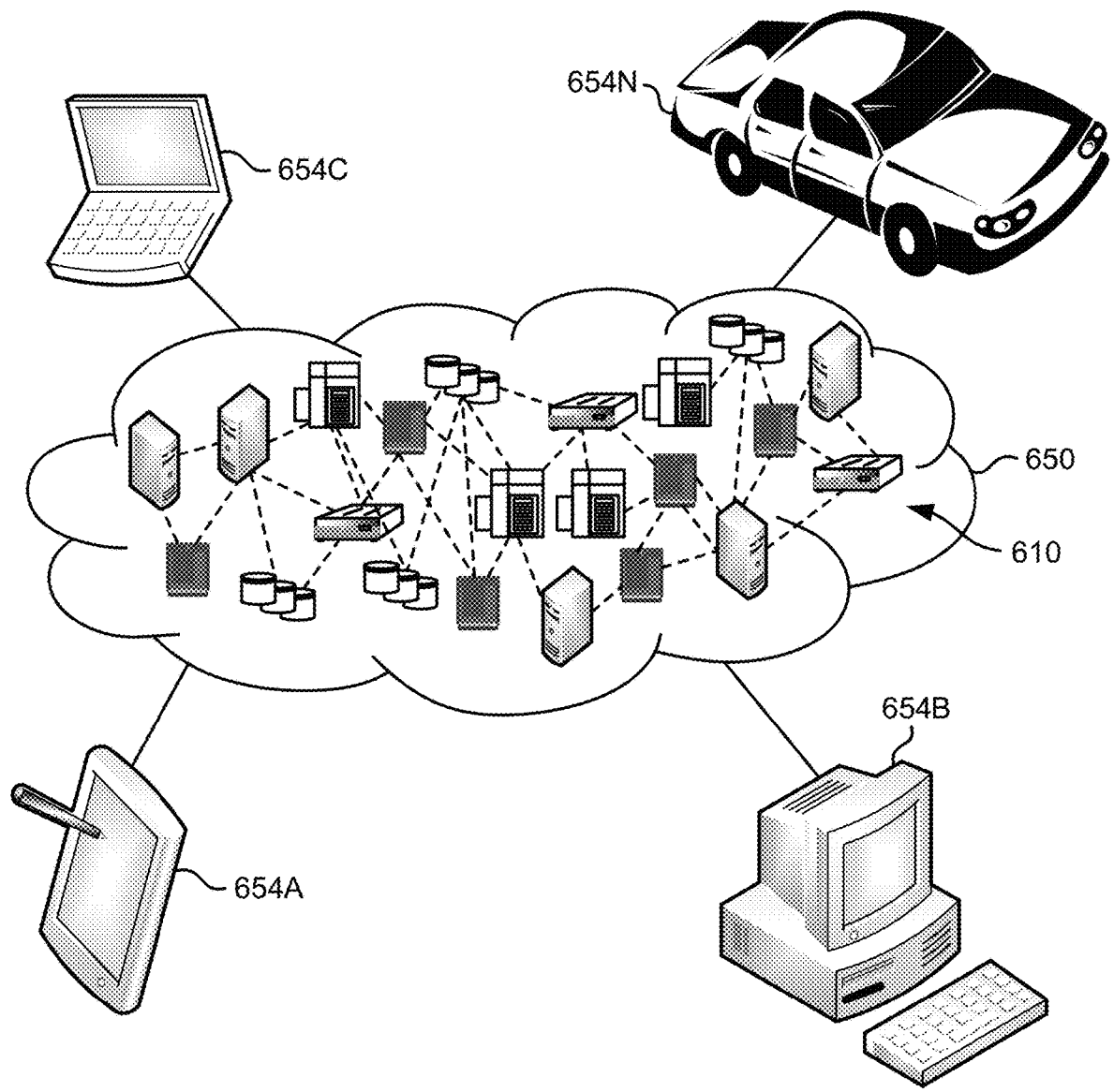
FIG. 6 depicts a cloud computing environment in accordance with one embodiment.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-654N shown in FIG. 6 are intended to be illustrative only and that computing nodes 610 and cloud computing environment 650 can communicate with any type of computerized device over any type of network and/or network addressable connection (e.g., using a web browser).

Figure 7:
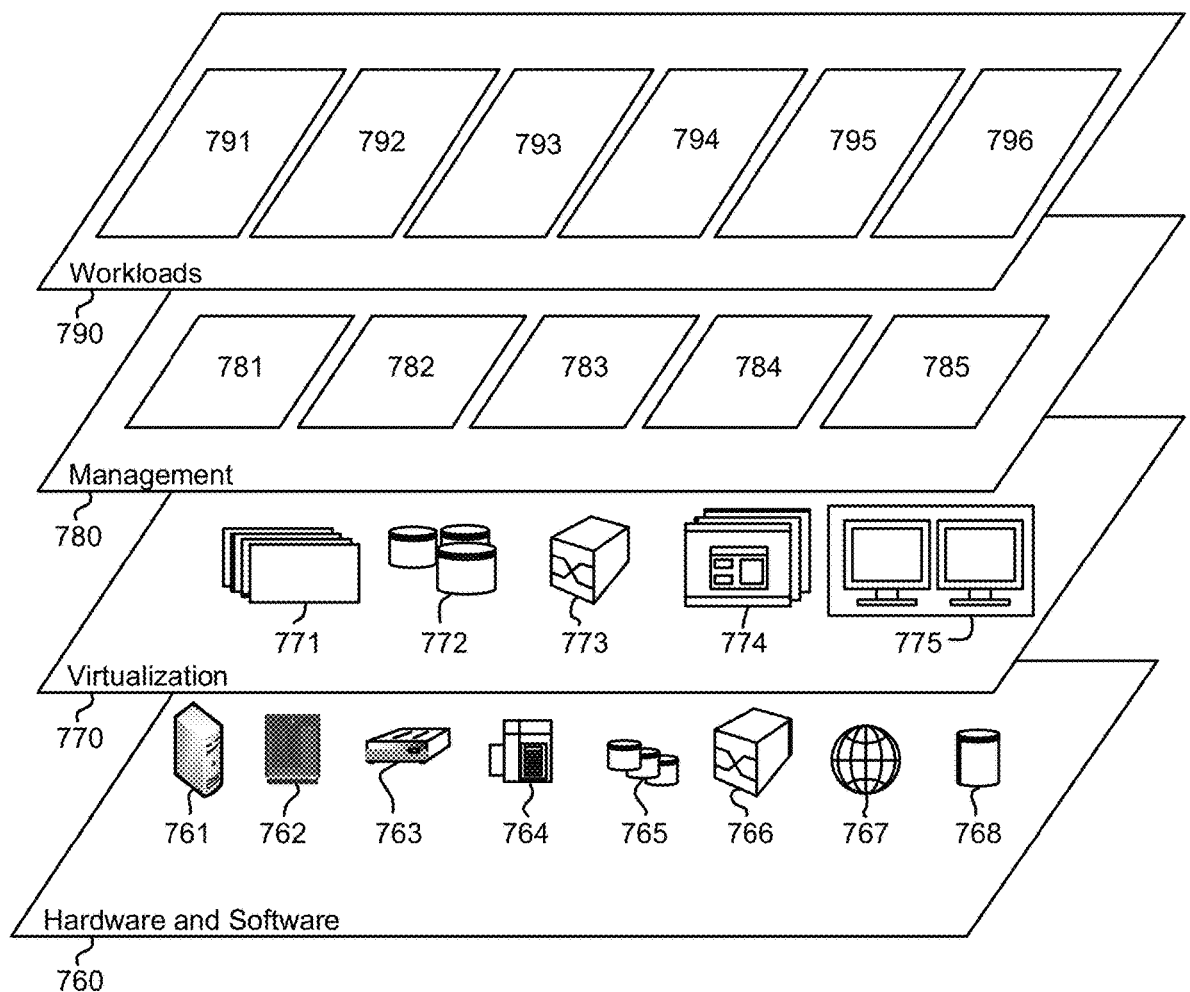
FIG. 7 depicts abstraction model layers in accordance with one embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and facilitating testing environments having specific devices therein 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, at a computer, a request to facilitate a testing environment, wherein the request specifies a number and type of resources to be included in the testing environment;
   inspecting a database, wherein the database lists available resources in systems and/or devices that are in communication with the computer;
   comparing the available resources to the number and type of resources specified in the request to be included in the testing environment;
   in response to determining that a valid combination of the available resources meets the number and type of resources specified in the request to be included in the testing environment, causing the database to be updated to indicate that each of the resources in the valid combination are in use; and
   satisfying the request by returning information about the resources in the valid combination.

2. The computer-implemented method of claim 1, wherein satisfying the request by returning the information about the resources in the valid combination includes:
   provisioning the resources in the valid combination to a logical framework; and
   returning an accounting of available keys which correspond to the resources in the valid combination.

3. The computer-implemented method of claim 1, comprising:
   causing the database of available resources to be updated by:
      querying the systems and/or devices that are in communication with the computer,
      adding an entry in the database for each newly discovered resource, and removing an entry from the database for each resource that is no longer included in the queried systems and/or devices.

4. The computer-implemented method of claim 1, wherein the computer is included in a cloud computing environment.

5. The computer-implemented method of claim 1, comprising:
   receiving an indication that the resources in the valid combination are no longer in use; and
   causing the database to be updated to indicate that each of the resources in the valid combination are available for use,
   wherein a bitmap of the database is updated to indicate that each of the resources in the valid combination are available for use.

6. The computer-implemented method of claim 5, wherein marking each of the resources in the valid combination as being in use and marking each of the resources in the valid combination as being available for use includes causing flags in the database which correspond to each of the respective resources to be updated.

7. The computer-implemented method of claim 1, wherein the request specifies capacity levels, functional capabilities, and data separation settings of the resources to be included in the testing environment for testing a disaster recovery procedure.

8. A computer program product, the computer program product comprising a computer readable storage medium having program instructions embodied therewith, the program instructions readable and/or executable by a processor to cause the processor to:
   receive, by the processor, a request to facilitate a testing environment, wherein the request specifies a number and type of resources to be included in the testing environment;
   inspect, by the processor, a database, wherein the database lists available resources in systems and/or devices that are in communication with the processor;
   compare, by the processor, the available resources to the number and type of resources specified in the request to be included in the testing environment;
   in response to determining that a valid combination of the available resources meets the number and type of resources specified in the request to be included in the testing environment, cause, by the processor, the database to be updated to indicate that each of the resources in the valid combination are in use; and
   satisfy, by the processor, the request by returning information about the resources in the valid combination.

9. The computer program product of claim 8, wherein satisfying the request by returning the information about the resources in the valid combination includes:
   provisioning the resources in the valid combination to a logical framework; and
   returning an accounting of available keys which correspond to the resources in the valid combination.

10. The computer program product of claim 8, wherein the program instructions are readable and/or executable by the processor to cause the processor to:
    cause, by the processor, the database of available resources to be updated by:
      querying the systems and/or devices that are in communication with the processor,
      adding an entry in the database for each newly discovered resource, and
      removing an entry from the database for each resource that is no longer included in the queried systems and/or devices.

11. The computer program product of claim 8, wherein the processor is included in a cloud computing environment.

12. The computer program product of claim 8, wherein the program instructions are readable and/or executable by the processor to cause the processor to:
    receive, by the processor, an indication that the resources in the valid combination are no longer in use; and
    cause, by the processor, the database to be updated to indicate that each of the resources in the valid combination are available for use.

13. The computer program product of claim 12, wherein marking each of the resources in the valid combination as being in use and marking each of the resources in the valid combination as being available for use includes causing flags in the database which correspond to each of the respective resources to be updated.

14. The computer program product of claim 8, wherein the request specifies capacity levels, functional capabilities, and data separation settings of the resources to be included in the testing environment.

15. A system comprising:
    a processor; and
    logic integrated with the processor, executable by the processor, or integrated with and executable by the processor, the logic being configured to:
    receive, by the processor, a request to facilitate a testing environment,
    wherein the request specifies a number and type of resources to be included in the testing environment,
    wherein the request specifies capacity levels, functional capabilities, and data separation settings of the resources to be included in the testing environment;
    inspect, by the processor, a database, wherein the database lists available resources in systems and/or devices that are in communication with the processor;
    compare, by the processor, the available resources to the number and type of resources specified in the request to be included in the testing environment;
    in response to determining that a valid combination of the available resources meets the number and type of resources specified in the request to be included in the testing environment, cause, by the processor, the database to be updated to indicate that each of the resources in the valid combination are in use; and
    satisfy, by the processor, the request by returning information about the resources in the valid combination.

16. The system of claim 15, wherein satisfying the request by returning the information about the resources in the valid combination includes:
    provisioning the resources in the valid combination to a logical framework; and
    returning an accounting of available keys which correspond to the resources in the valid combination.

17. The system of claim 15, wherein the logic is configured to:
    cause, by the processor, the database of available resources to be updated by:
      querying the systems and/or devices that are in communication with the processor,
      adding an entry in the database for each newly discovered resource, and
      removing an entry from the database for each resource that is no longer included in the queried systems and/or devices.

18. The system of claim 15, wherein the processor is included in a cloud computing environment.

19. The system of claim 15, wherein the logic is configured to:
- receive, by the processor, an indication that the resources in the valid combination are no longer in use; and
- cause, by the processor, the database to be updated to indicate that each of the resources in the valid combination are available for use.

20. The system of claim 15, wherein a bitmap of the database is used in the comparison.

* * * * *